United States Patent
Lee

(10) Patent No.: US 11,734,557 B2
(45) Date of Patent: Aug. 22, 2023

(54) NEURAL NETWORK WITH FROZEN NODES

(71) Applicant: QUALCOMM Incorporated, San Diego, CA (US)

(72) Inventor: Jisoo Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1504 days.

(21) Appl. No.: 15/976,974

(22) Filed: May 11, 2018

(65) Prior Publication Data

US 2019/0347538 A1 Nov. 14, 2019

(51) Int. Cl.
| | |
|---|---|
| *G06N 3/08* | (2023.01) |
| *G06T 7/11* | (2017.01) |
| *G06N 3/045* | (2023.01) |
| *G06V 10/764* | (2022.01) |
| *G06V 10/82* | (2022.01) |
| *G06V 20/00* | (2022.01) |

(52) U.S. Cl.
CPC ............... *G06N 3/08* (2013.01); *G06N 3/045* (2023.01); *G06T 7/11* (2017.01); *G06V 10/764* (2022.01); *G06V 10/82* (2022.01); *G06V 20/00* (2022.01); *G06T 2207/20084* (2013.01)

(58) Field of Classification Search
CPC ........ G06N 3/0454; G06N 3/08; G06N 3/045; G06T 7/11; G06T 2207/20084; G06V 10/82; G06V 10/764; G06V 20/00
See application file for complete search history.

(56) References Cited

U.S. PATENT DOCUMENTS

| | | | | |
|---|---|---|---|---|
| 5,710,830 | A | * | 1/1998 | Holeva ..................... F24C 7/06 358/464 |
| 6,028,956 | A | * | 2/2000 | Shustorovich ....... G06V 30/166 382/173 |
| 10,109,092 | B1 | * | 10/2018 | Hitchings, Jr. ......... G06T 11/60 |
| 2014/0258195 | A1 | * | 9/2014 | Weng ....................... G06N 3/08 706/19 |
| 2015/0348247 | A1 | | 12/2015 | Mclaughlin et al. |
| 2016/0155049 | A1 | * | 6/2016 | Choi ...................... G06N 3/084 706/16 |
| 2017/0111671 | A1 | | 4/2017 | Bhogal et al. |
| 2017/0228633 | A1 | | 8/2017 | Danihelka et al. |
| 2017/0249547 | A1 | | 8/2017 | Shrikumar et al. |

(Continued)

OTHER PUBLICATIONS

A new algorithm to design compact two-hidden-layer artificial neural networks—Islam 2001 (Year: 2001).*

(Continued)

*Primary Examiner* — Phuc N Doan
(74) *Attorney, Agent, or Firm* — Duane Morris LLP/Qualcomm incorporated

(57) ABSTRACT

A first image can be processed through a neural network. The first image can cause each first hidden node to assume a first state. A second image can be accessed along with a region-of-interest (ROI) for the second image. At least some of the first hidden nodes can be frozen based on the ROI. At least some of the first hidden nodes can be kept fluid based on the ROI. The second image can be processed through the neural network. The fluid first hidden nodes can assume second states. The frozen first hidden nodes can remain in the first state.

20 Claims, 14 Drawing Sheets

(56) References Cited

U.S. PATENT DOCUMENTS

2021/0016440 A1\* 1/2021 Cassidy, II ............. B25J 9/1664
2021/0275107 A1\* 9/2021 Pitters .................... A61B 5/112

OTHER PUBLICATIONS

A_new_weight_freezing_method_for_reducing_training_time_in_designing_artificial_neural_networks (Year: 2001).\*

Evolutionary pruning of transfer learned deep Samala_2018_Phys._Med._Biol._63_095005 (Year: 2018).\*

Sun, View-invariant gait recognition based on kinect, 2018 (Year: 2018).\*

\* cited by examiner

NEURAL NETWORK WITH FROZEN NODES

BACKGROUND

Field of the Disclosure

The present disclosure relates to neural networks.

Description of Related Art

Neural networks can extract desired features from (i.e., analyze) incoming data, such as images (e.g., video frames). Neural networks often include a plurality of neurons arranged in layers. In a feedforward neural network, downstream layers of neurons can operate on the outputs of upstream layers of neurons. The layers can transform the original data into a final score, which quantifies and/or identifies (i.e., extracts) the desired features.

Each neuron can have a similar form. The form can include a weight matrix, an activation function, and a bias. A neural network can automatically adjust variables within the form (e.g., the weights in the weight matrix, the bias) during training. In supervised training, a user can supply the neural network with training pairs. Each pair can include a known entry and the corresponding correct outcome (e.g., an image and the desired features that the image contains). The neural network can operate on the known entry to produce a trial outcome. The neural network can compare the trial outcome with the correct outcome. If they differ, the neural network can automatically readjust (i.e., retrain) until the trial outcome matches (i.e., is sufficiently similar to) the correct outcome.

Neural networks are advantageous because a machine can automatically perform a large portion of the software programming needed to perform a task such as feature extraction. After training, a user can feed unfamiliar entries (i.e., entries with unknown correct outcomes) into the neural network. A well trained neural network should correctly analyze the unfamiliar entries.

SUMMARY

Disclosed is a system for processing image data with a neural network. The system can include memory configured to store image data, including a first image and a second image; and one or more processors configured to process images through the neural network.

The neural network can include: an entry layer comprising fluid entry nodes; a first hidden layer comprising fluid first hidden nodes; a second hidden layer comprising fluid second hidden nodes; and an exit layer comprising fluid exit nodes.

The one or more processors can be configured to: process a first image through the neural network, the first image causing each of the fluid first hidden nodes, the fluid second hidden nodes, and the fluid exit nodes to assume a first state; access a second image and a region-of-interest (ROI) mapping to the second image; freeze at least some of the fluid first hidden nodes based on the ROI while keeping at least some of the first hidden nodes fluid; process the second image through the neural network to cause each of the fluid first hidden nodes to assume a second state while at least some of the frozen first hidden nodes remain in the first state.

Disclosed is a system for processing image data with a neural network. The neural network can include: an entry layer comprising fluid entry nodes; a first hidden layer comprising fluid first hidden nodes; a second hidden layer comprising fluid second hidden nodes; and an exit layer comprising fluid exit nodes.

The system can include: means for processing a first image through the neural network, the first image causing each of the fluid first hidden nodes, the fluid second hidden nodes, and the fluid exit nodes to assume a first state; means for accessing a second image and a region-of-interest (ROI) mapping to the second image; means for freezing at least some of the fluid first hidden nodes based on the ROI while keeping at least some of the first hidden nodes fluid; means for processing the second image through the neural network to cause each of the fluid first hidden nodes to assume a second state while at least some of the frozen first hidden nodes remain in the first state.

Disclosed is a method of processing image data with a neural network. The neural network can include: an entry layer comprising fluid entry nodes; a first hidden layer comprising fluid first hidden nodes; a second hidden layer comprising fluid second hidden nodes; and an exit layer comprising fluid exit nodes.

The method can include, via a processing system comprising one or more processors and memory configured to storage image data, including a first image and a second image: processing the first image through the neural network, the first image causing each of the fluid first hidden nodes, the fluid second hidden nodes, and the fluid exit nodes to assume a first state; accessing the second image and a region-of-interest (ROI) mapping to the second image; freezing at least some of the fluid first hidden nodes based on the ROI while keeping at least some of the first hidden nodes fluid; processing the second image through the neural network to cause each of the fluid first hidden nodes to assume a second state while at least some of the frozen first hidden nodes remain in the first state.

A non-transitory computer-readable storage medium can include instructions. The instructions can include code for executing a neural network comprising: (a) an entry layer comprising fluid entry nodes, (b) a first hidden layer comprising fluid first hidden nodes, (c) a second hidden layer comprising fluid second hidden nodes, and (d) an exit layer comprising fluid exit nodes.

The instructions can include: code for processing a first image through the neural network, the first image causing each of the fluid first hidden nodes, the fluid second hidden nodes, and the fluid exit nodes to assume a first state; code for accessing a second image and a region-of-interest (ROI) mapping to the second image; code for freezing at least some of the fluid first hidden nodes based on the ROI while keeping at least some of the first hidden nodes fluid; code for processing the second image through the neural network to cause each of the fluid first hidden nodes to assume a second state while at least some of the frozen first hidden nodes remain in the first state.

BRIEF DESCRIPTION OF THE DRAWINGS

The above summary and the below detailed description of illustrative embodiments may be better understood when read in conjunction with the appended Figures. The Figures show some of the illustrative embodiments discussed herein. As further explained below, the claims are not limited to the illustrative embodiments. For clarity and ease of reading, some Figures omit views of certain features. Unless stated otherwise, the Figures are not to scale and features are shown schematically.

Figure 6A:
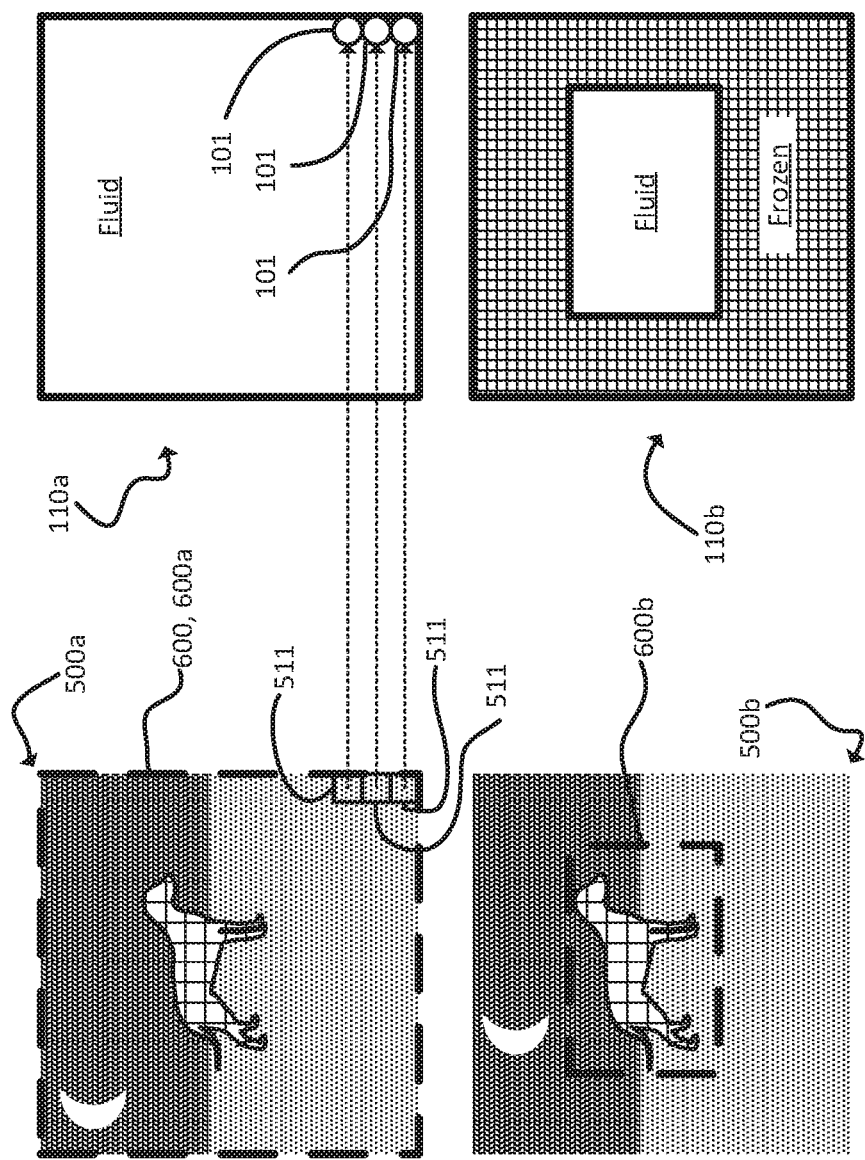
Figure 6B:
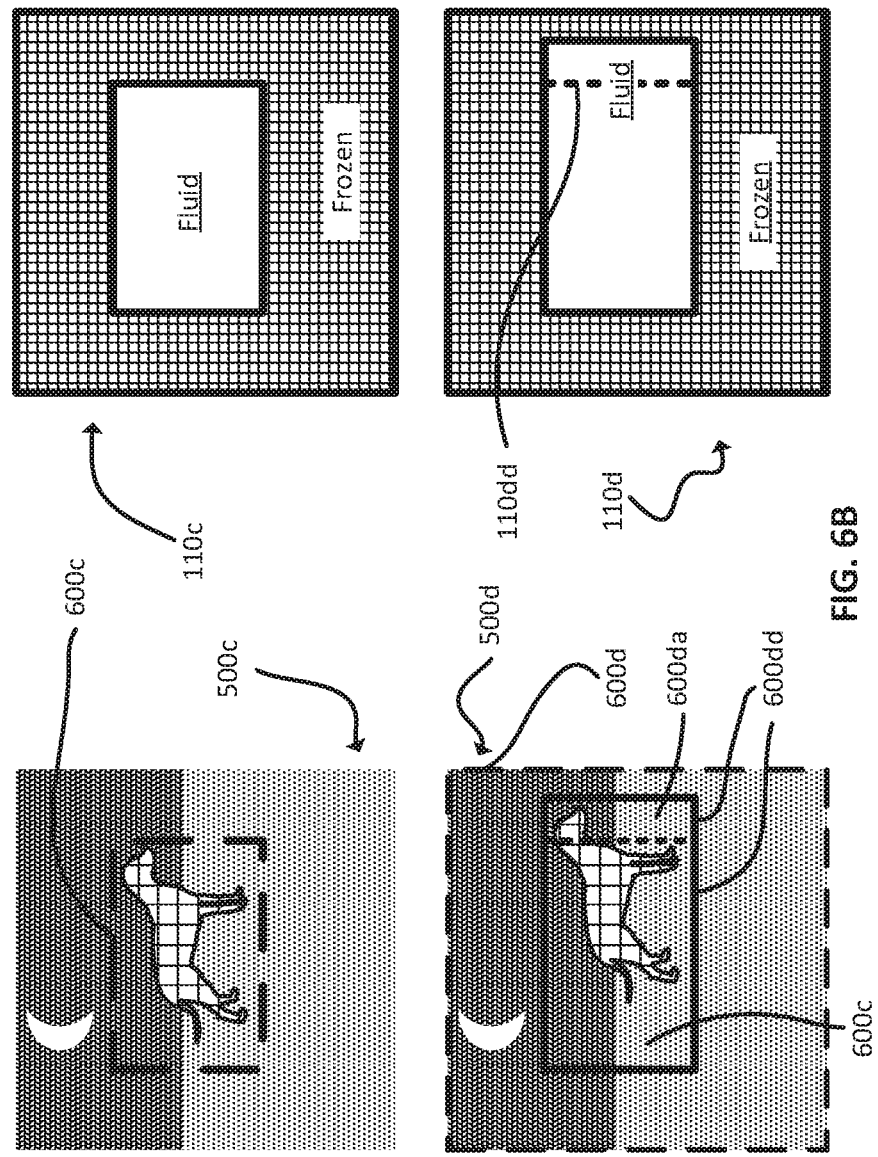

The left side of FIGS. 6A and 6B show a sequence of frames for entry into the neural network. The right side of FIGS. 6A and 6B schematically illustrates how the input layer freezes in response to the frames.

Figure 7:
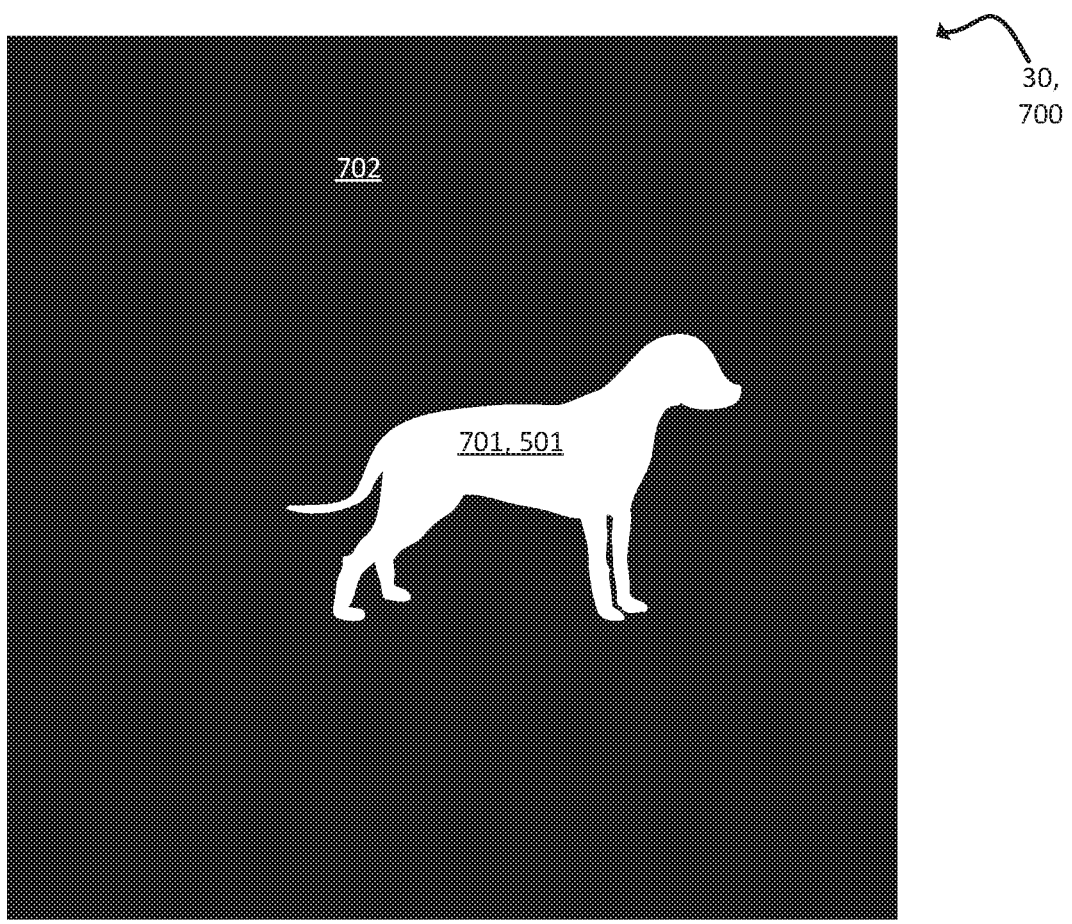

FIG. 7 shows an example outcome of a neural network processing cycle.

Figure 8:
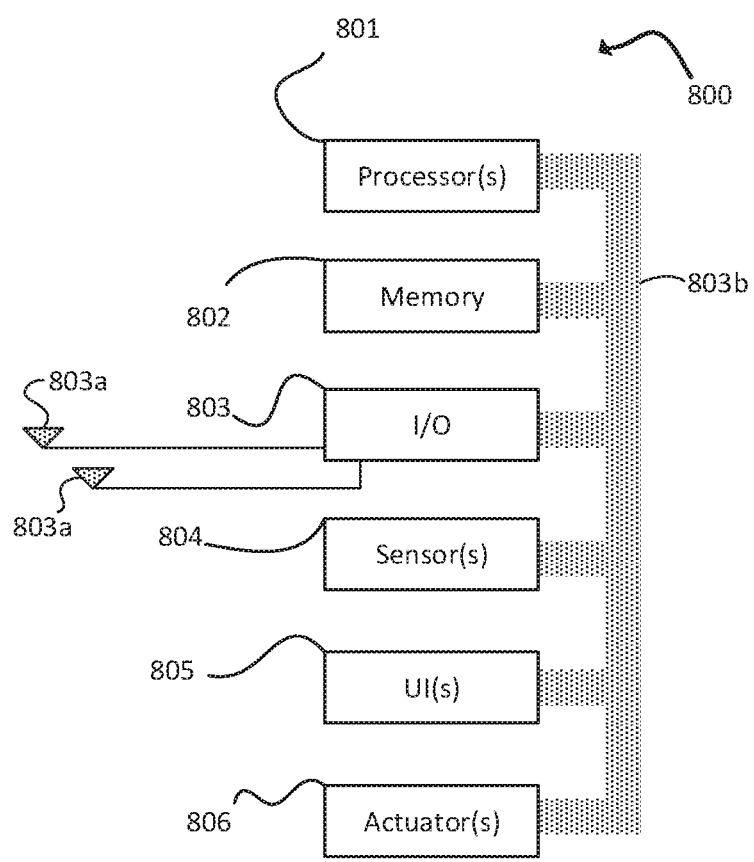

FIG. 8 is a block diagram of an example processing system.

Figure 9:
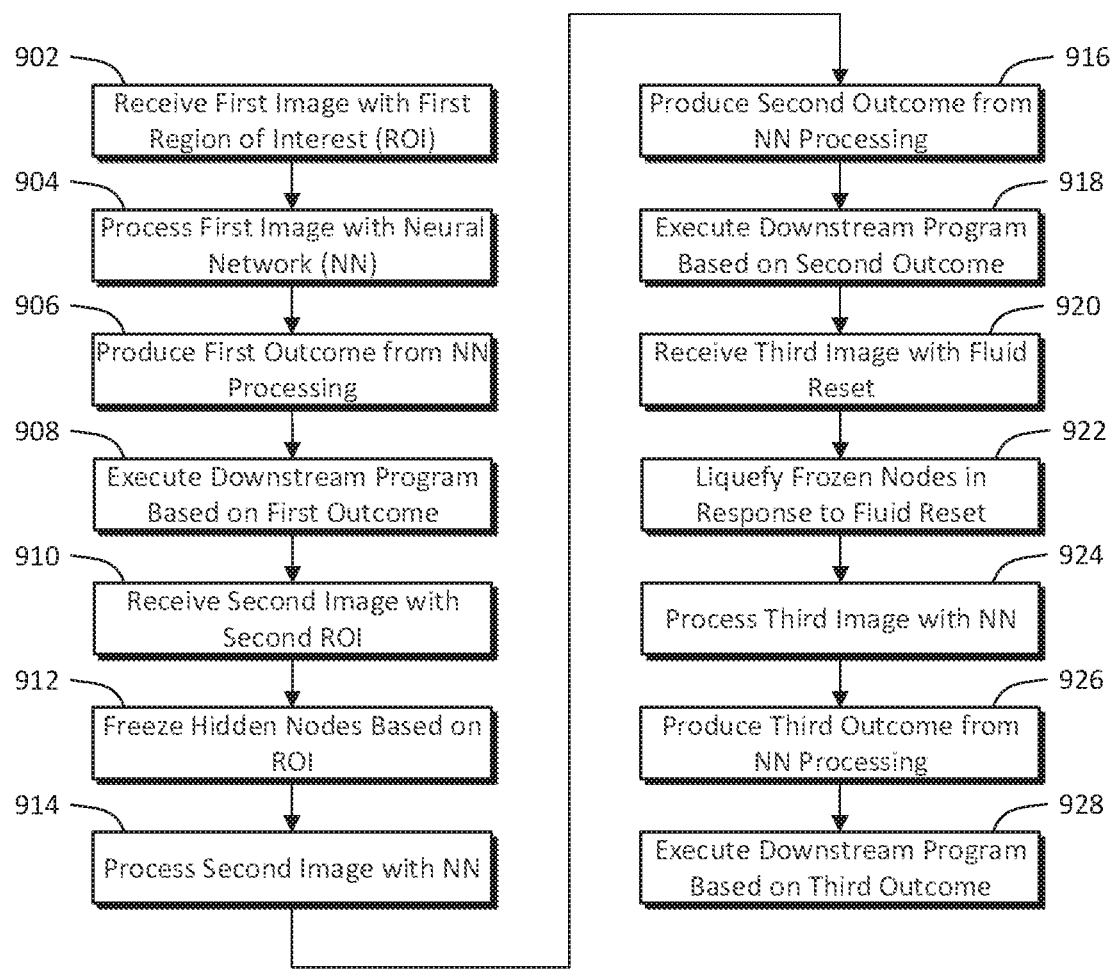

FIG. 9 is a block diagram of an example method.

DETAILED DESCRIPTION

The present application includes illustrative embodiments. The claims are not limited to the illustrative embodiments. Therefore, some claimed implementations will have different features than in the illustrative embodiments. Changes can be made without departing from the spirit of the disclosure. For example, features of the illustrative embodiments can be incorporated in different systems (e.g., devices) and methods. The claims are intended to cover implementations with such changes.

At times, the present application uses directional terms (e.g., front, back, top, bottom, left, right, etc.) to give the reader context when viewing the Figures. Directional terms do not limit the claims. Any absolute term (e.g., large, small) can be replaced with a relative term (e.g., larger, smaller).

Among other things, a neural network 100 is disclosed. Neural network 100 can analyze an entry 10, which can be a block of data (e.g., an image with metadata). Neural network can include nodes 101 arranged in layers. Nodes 101 can perform mathematical operations to produce an outcome 30 from the entry 10.

Figure 5:
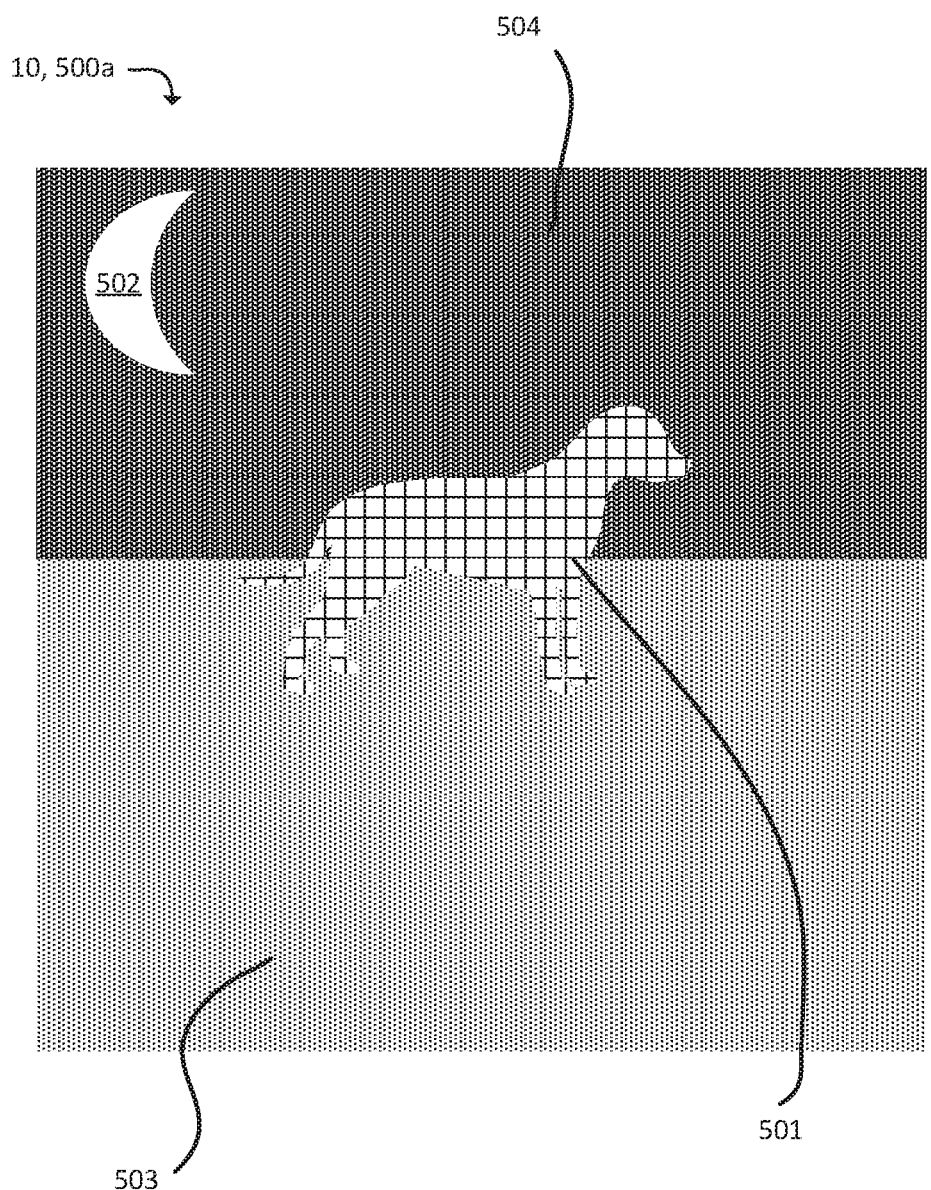
FIG. 5 shows an example image for entry into the neural network.

For example, referring to FIG. 5, image 500a can be an entry 10. Neural network 100 can be configured to identify any regions of image 500a depicting animals (e.g., dogs). FIG. 7 shows an example outcome 30 in the form of map 700. As illustrated in FIG. 7, the white region 701 of map 700 identifies image pixels in image 500a depicting dog 501. The black region 702 of map 700 identifies image pixels external to dog 501.

Map 700 can be used by downstream software (i.e., can be used by one or more processors when executing downstream software) to further analyze and/or adjust image 500a. For example, downstream software (e.g., an image editing studio) can blur image pixels mapping to black region 702 while retaining the crispness of image pixels mapping to white region 701. This operation can simulate a depth-of-field (i.e., Bokeh) effect. Map 700 can therefore enhance accuracy of a simulated depth-of-field effect.

As another example, downstream software (e.g., a feature recognition program) can rely on map 700 to determine the identity of dog 501. More specifically, map 700 can steer the feature recognition program to the relevant portions of image 500a (e.g., the image pixels mapping to white portion 701) and away from the irrelevant portions of image 500a (e.g., the image pixels mapping to black portion 702). As a result, map 700 can enhance efficiency and/or accuracy of a feature recognition program.

Because neural network 100 can include, for example, millions of nodes 101, computation of map 700 can be time and/or energy expensive. Image 500a can be coupled with metadata describing a region-of-interest ("ROI") 600, such as ROI 600b in FIG. 6A. To conserve time and/or energy, computational resources for processing image 500a through neural network 100 can be allocated based on ROI 600b.

For example, neural network 100 can only update nodes 101 of neural network 100 that link (directly or indirectly) to image pixels within ROI 600. As discussed below, these can be called fluid nodes 101x. Nodes 101 that do not link to image pixels within ROI 600b can remain in their previous states. As discussed below, these can be called frozen nodes 101z.

By applying frozen and fluid nodes 101x, 101z, neural network 100 can analyze an entry 10 faster, more efficiently, and/or more accurately. Neural network 100 can therefore improve a user's experience by, for example: conserving battery energy, increasing the rate at which downstream software receives map 700 (and therefore the rate at which the downstream software is able to deliver a result, such as an image with an artificial depth-of-field effect), and/or improving the accuracy of the downstream software by improving the accuracy of map 700.

Figure 1:
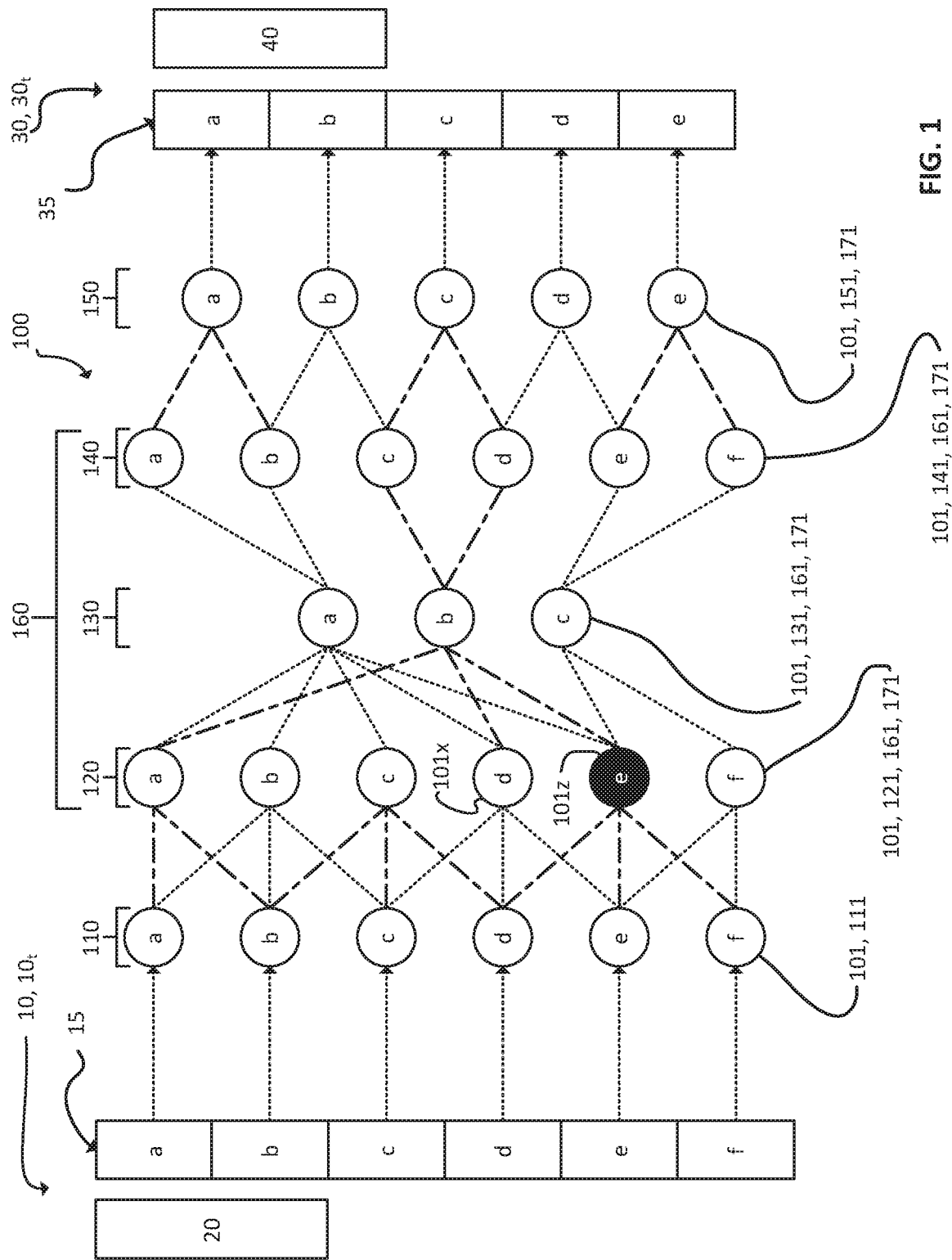
FIG. 1 is a schematic diagram of an example neural network.

Referring now to FIG. 1, neural network ("NN") 100 can include an entry layer 110 (also called an input layer), a plurality of hidden layers 160, and an exit layer 150 (also called an output layer). Each layer can include a plurality of nodes 101. Entry layer 110 can include entry nodes 111, first hidden layer 120 can include first hidden nodes 121, second hidden layer 130 can include second hidden nodes 131, third hidden layer 140 can include third hidden nodes 141, and exit layer 150 can include exit nodes 151. The central letters identify specific nodes and blocks of information (discussed below). For example, the second hidden node 131 with a central "b" is second hidden node 131b. First, second, and third hidden nodes 121-141 are generically called hidden nodes 161.

NN 100 can analyze (i.e., operate on) an entry 10 to produce an outcome 30. Entry 10 can include an entry matrix 15 (e.g., a matrix with one or more dimensions, rows, and/or columns) of values such as an image (e.g., a frame of a video), a piece of audio (e.g., a Fourier transform of a waveform, and so on), and the like. Outcome 30 can similarly include an outcome matrix 35 (e.g., a matrix with one or more dimensions, rows, and/or columns) of values, such as an image, a piece of audio, a classification matrix, and the like.

Entry 10 can include information blocks 15a-15f and metadata 20. Metadata 20 can include an encoded region-of-interest ("ROI"). FIG. 6A shows an example ROI 600b for image 500b. Entry metadata 20 can be an aspect of entry matrix 15. Entry blocks 15a-15f can represent discrete values, such as pixel color values. Outcome 30 can include information blocks 35a-35f and metadata 40. Outcome blocks 35a-35f can represent discrete values, such as pixel color values or probabilities. Outcome metadata 40 can be an aspect of outcome matrix 35.

Each entry node 111 can intake a value from one or more entry blocks 15a-15f. In FIG. 1, each entry node 111 intakes a value from a different entry block 15a-15f. Each entry node 111 can return (i.e., output) a value that is a function of the intake(s). The function can be linear or nonlinear. In FIG. 1, the return of each input node 111 is equal to the intake.

Each downstream node 101 can link to one or more upstream nodes. The one or more upstream nodes 101 linked to a downstream node 101 define a receptive field of the downstream node 101. FIG. 1 alternates between two kinds of broken lines to illustrate how links define receptive fields. In FIG. 1, first hidden node 121a links to entry nodes 111a and 111b. First hidden node 121a thus has a receptive field consisting of entry nodes 111a and 111b. Second hidden node 121b links to entry nodes 111a, 111b, and 111c and thus has a receptive field consisting of entry nodes 111a, 111b, and 111c.

The hidden and output nodes 161, 151 can be formatted as neurons 171. Each neuron 171 can have a weight matrix, a bias, and an activation function. Each neuron 171 can produce a result that is a function of (a) the result of each upstream node in the local receptive field of the neuron 171, (b) the weight matrix, (c) the bias, and (d) the activation function. In this way, nodes in downstream layers can operate on results from upstream layers. Data can sequentially flow through NN 100 from entry layer 110 until reaching exit layer 150. Exit layer nodes 151 can each deposit a result in a block 35a-35e of outcome matrix 35. Nodes 101 can return zeros, positive values, or negative values.

NN 100 has been simplified for the reader's convenience. NN 100 can include any number of layers (tens, hundreds, thousands, millions, etc). Each layer can have any number of levels. Each level can have any number of nodes 101. Nodes 101 can be arranged two dimensionally within levels and levels can be arranged in stacks to give each layer three or more dimensions, as further discussed below. NN 100 can be feedforward, as in FIG. 1, but can alternatively be recurrent. NN 100 can include convolutional layers (i.e., layers with convolutional local receptive fields), such as first hidden layer 120. NN 100 can include fully connected layers.

Figure 2:
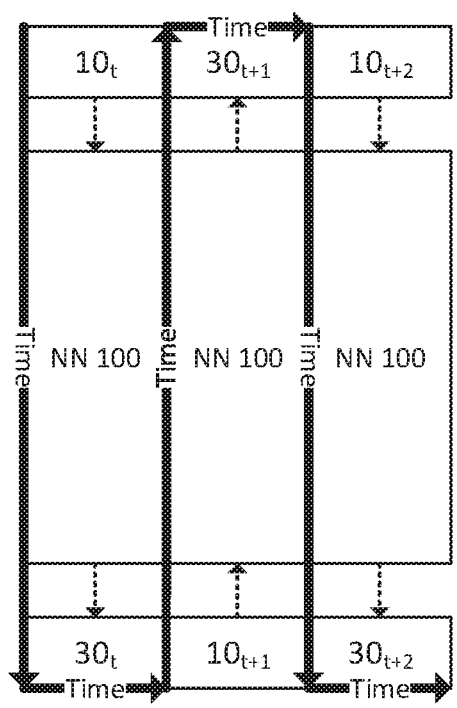
FIG. 2 shows the neural network sequentially processing entries.

NN 100 can be configured to process entries 10 in sequence. FIG. 2 shows entries $10_t$, $10_{t+1}$, and $10_{t+2}$. NN 100 can be configured to produce outcome $30_t$ from entry $10_t$, outcome $30_{t+1}$ from entry $10_{t+1}$, and outcome $30_{t+2}$ from entry $10_{t+2}$. Time, t, can mean "absolute time" or "cycle". For example, entry 10 can be a first frame in a video, entry $10_{t+1}$ can be the second frame, and entry $10_{t+2}$ can be the third frame, and so on.

NN 100 can be configured to freeze fluid nodes (i.e., convert fluid nodes into frozen nodes) and liquefy frozen nodes (i.e., convert frozen nodes into fluid nodes) over time. Throughout the Figures, black circles with white text represent frozen nodes 101z and white circles with black text represent fluid nodes 101x. Until now, nodes 101 have been described in their fluid state. Frozen nodes can be in a paused or suspended state.

Let the result, $R_{fluid}$, of any fluid node 101x, be a function, f, of intake matrix IM (which lists the results produced by upstream nodes 101 in the local receptive field of the downstream node), the activation function, AF, the weight matrix, W, and the bias, b, such that: $R=f(IM, W, AF, b)$. Let NN 100 be trained such that W, AF, and b are constant (for any given node 101). Let N be any arbitrary time (e.g., cycle) with a range $[0, \infty]$. According to some embodiments: $R_{fluid,\ t+N}=f(IM_{t+N}, W, AF, b)$.

Frozen nodes 101z can be configured to perpetually produce a predetermined result (until liquefied). The predetermined result of a frozen node 101z can be the last fluid result of the frozen node 101z. Let L have a range [0, N]. Let t+L be the most recent time the particular node was fluid. According to some embodiments: $R_{frozen,\ t+N}=R_{fluid,\ t+L}=f(IM_{t+L}, W, AF, b)$. If the frozen node 101z is defined to be frozen at t+N and fluid at t+L, then: $R_{t+N}=R_{t+L}=f(IM_{t+L}, W, AF, b)$.

According to some embodiments, and for any node 101: $R_t=f(IM_{g(t)}, W, AF, b)$, where g(t) is the last time the node was fluid. If the node is currently fluid, then g(t)=t. Nodes 101 not formatted as neurons (e.g., entry nodes 111) can observe this equation by making W and AF equal to unity, b equal to zero.

As described above, frozen nodes 101z are not necessarily in an off state. Frozen nodes 101z can contribute to an outcome 30. Let FIG. 1 represent an example cycle of example NN 100 at time t+1. At time t, first hidden node 121e was fluid and produced a result, $R_{t,\ 121e}$ based on a function of $W_{121e}$, $AF_{121e}$, $b_{121e}$, and $IM(R_{t,\ 111d}, R_{t,\ 111e}, R_{t,\ 111f})$. At time t, second hidden node 131b produced a result $R_{t,\ 131b}$ based on $R_{t,\ 121e}$ (e.g., based on a function of $W_{131b}$, $AF_{131b}$, $b_{131b}$, and $IM(R_{t,\ 121a}, R_{t,\ 121d}, R_{t,\ 121e})$.

Now, at time t+1, first hidden node 121e is frozen. Thus, during the present example cycle of example NN 100 at time t+1, first hidden node 121e produces a result $R_{t+1,\ 121e}=R_{t,\ 121e}$. And during the same cycle at time t+1, second hidden node 131b produces a result $R_{t+1,\ 131b}=f(W_{131b}, AF_{131b}, b_{131b}, IM(R_{t+1,\ 121a}, R_{t+1,\ 121d}, R_{t+1,\ 121e})=f=f(W_{131b}, AF_{131b}, b_{131b}, IM(R_{t+1,\ 121a}, R_{t+1,\ 121d}, R_{t,\ 121e})$.

Figure 3A:
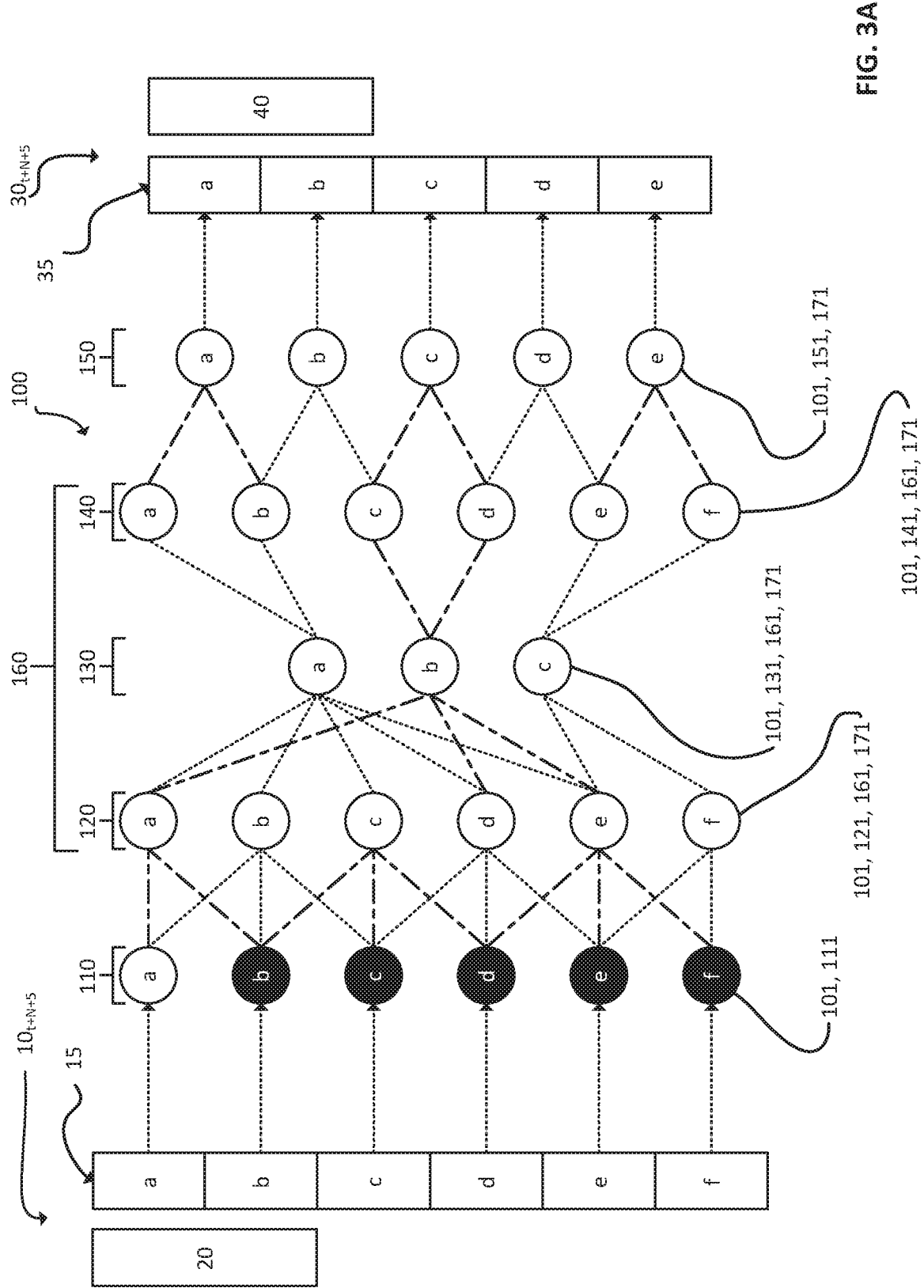
FIG. 3A-3E show frozen node propagation through the neural network.
Figure 3B:
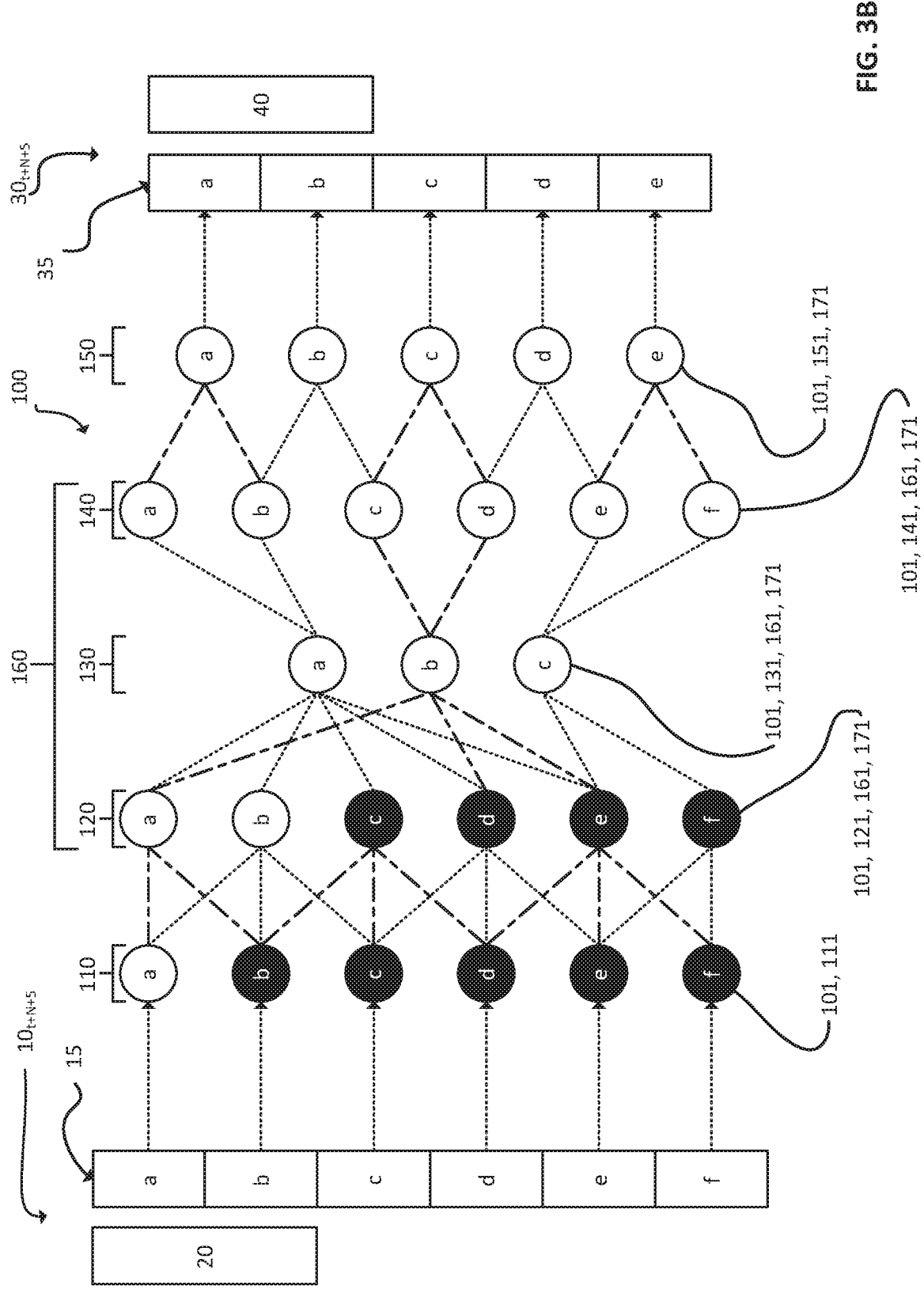
Figure 3C:
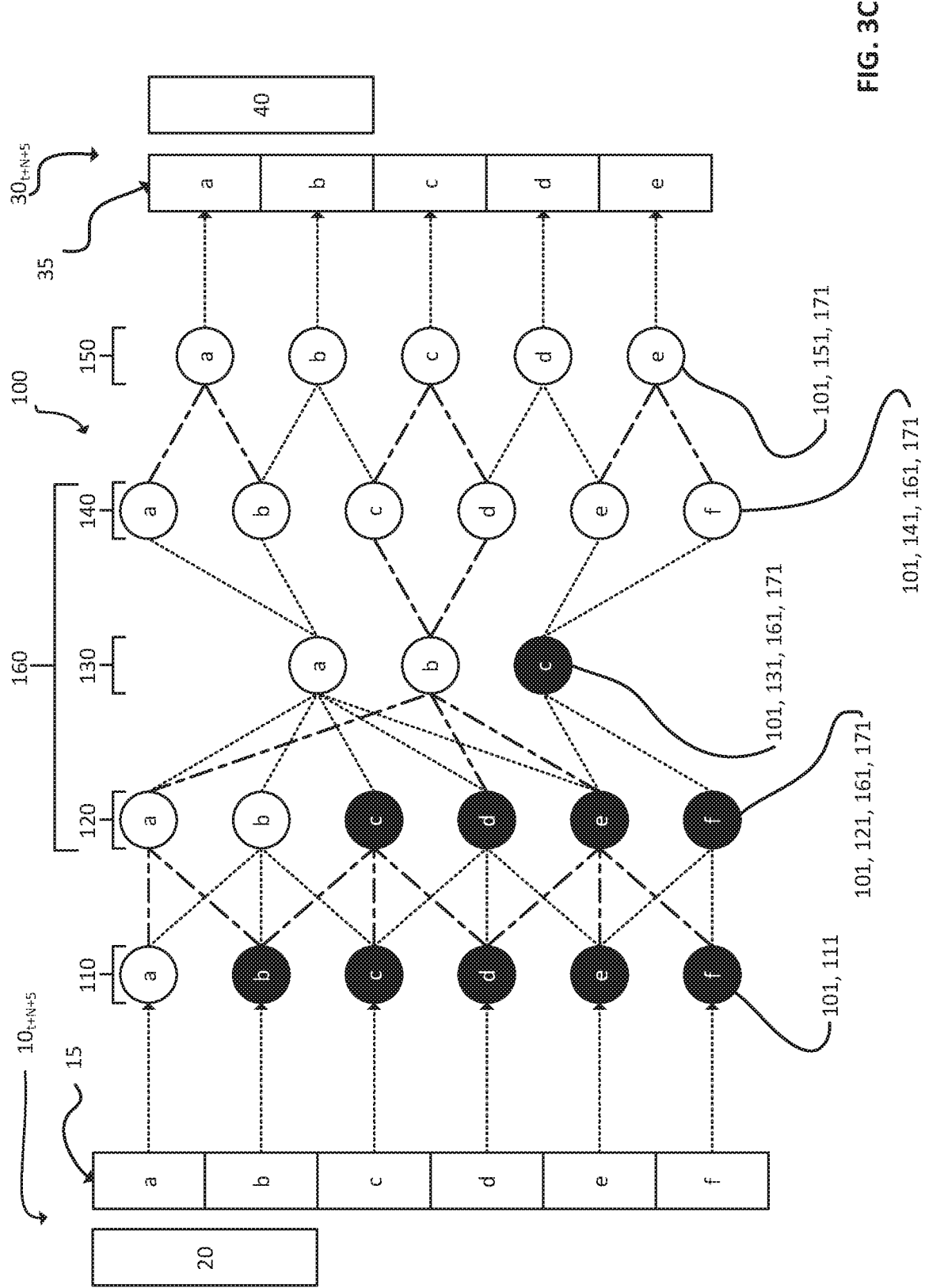
Figure 3D:
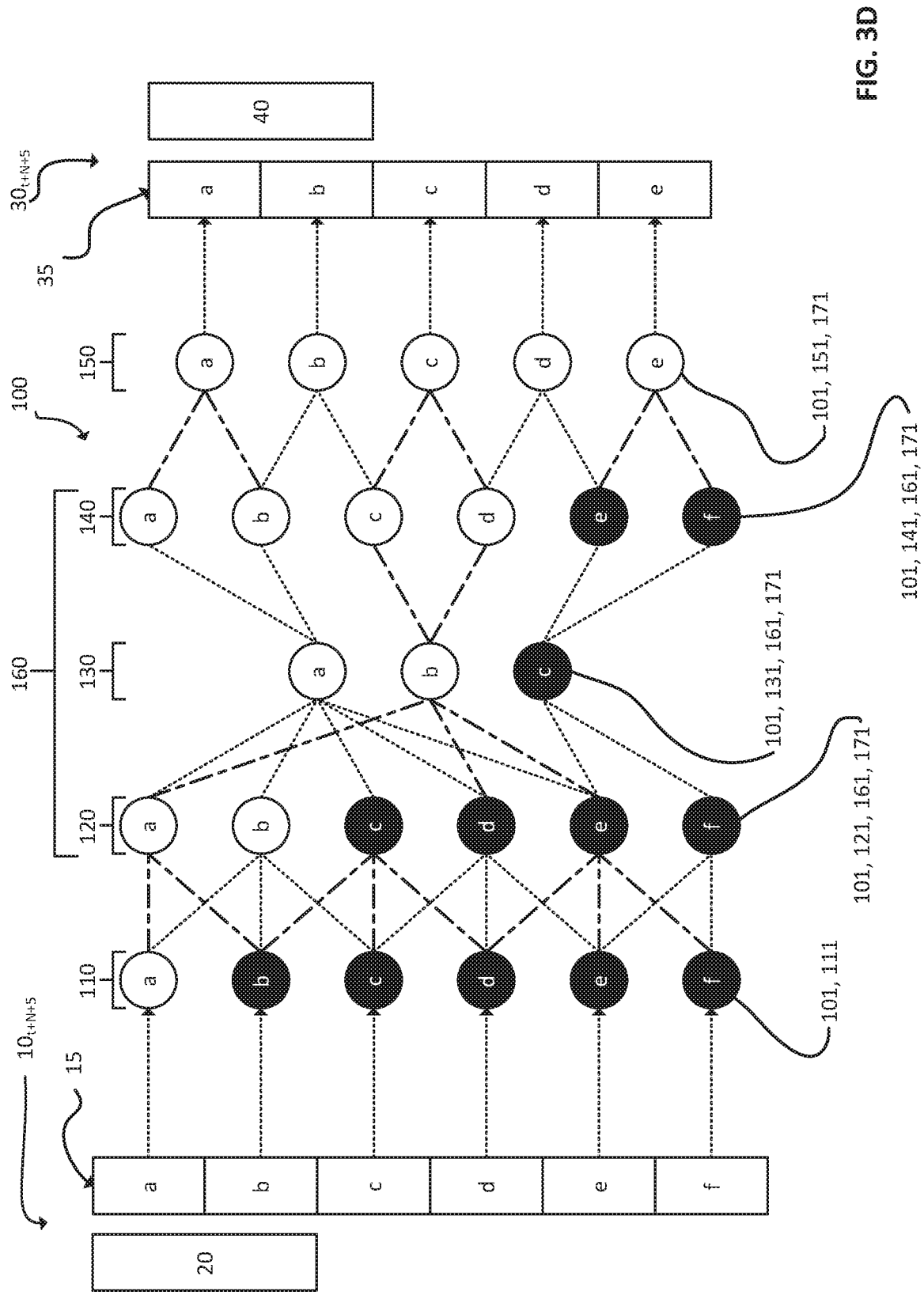

Referring to FIG. 3A, all nodes 101 were fluid 101x at time t+N+4. NN 100 can determine which nodes to freeze by starting with entry nodes 111. NN 100 can freeze entry nodes 111b-f based on information in metadata 20 of entry $10_{t+N+5}$. NN 100 can then find every node in the following layer (i.e., first hidden layer 120) exclusively linked to a frozen input node 111. Therefore, as shown in FIG. 3B, NN 100 has frozen first hidden nodes 121c-f FIG. 3C extends the process to second hidden layer 130 where only second hidden node 131c is frozen. Second hidden node 131a remains fluid by virtue of fluid nodes 121a, 121b. Second hidden node 131b remains fluid by virtue of fluid node 121a. In FIG. 3D, third hidden nodes 141e, 141f are frozen by virtue of being exclusively linked to node 131c. And in FIG. 3E, output node 151e is frozen by virtue of being exclusively linked to nodes 141e, 141f.

Figure 3E:
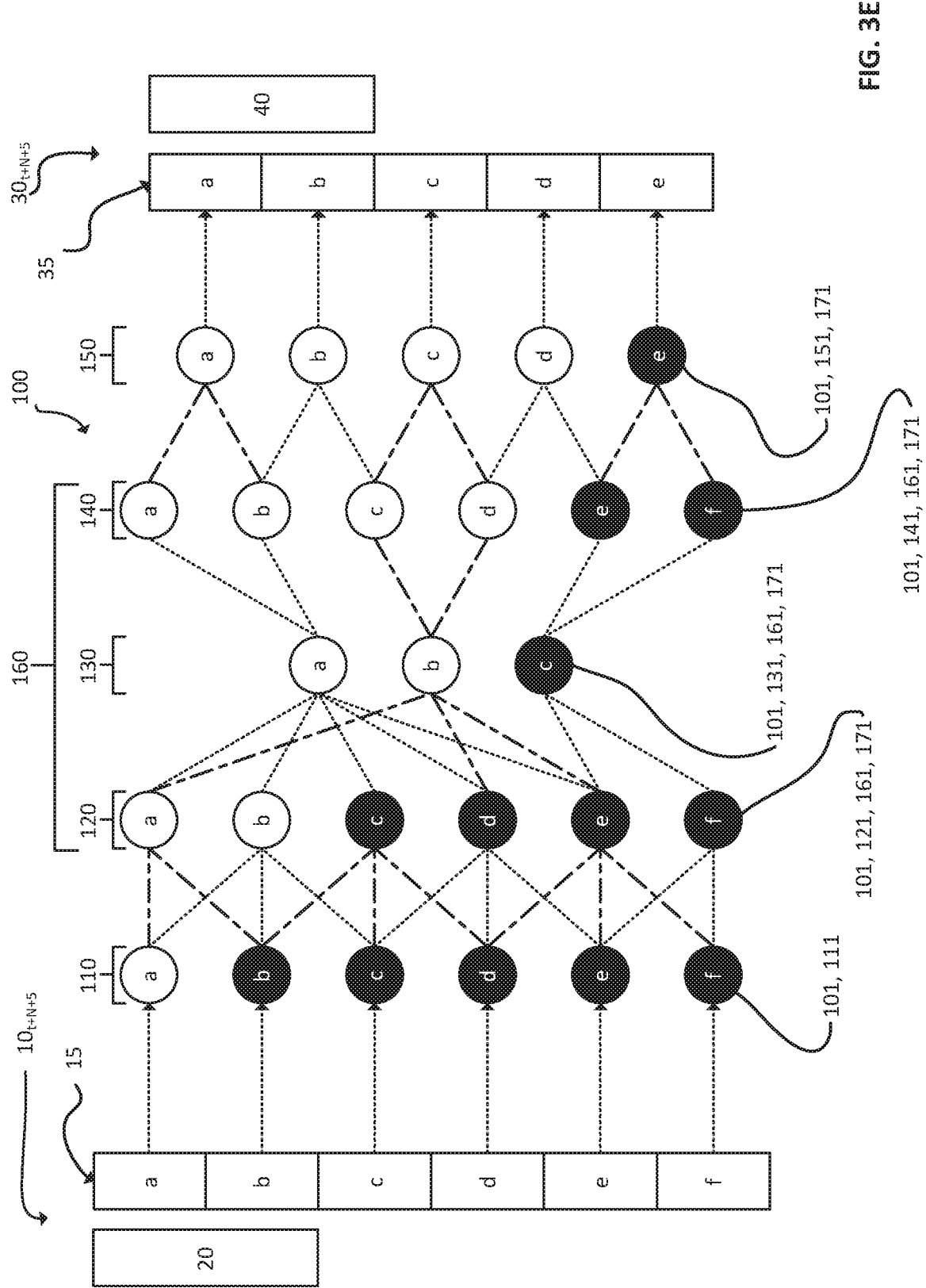

NN 100 can save the results, R, for frozen nodes 101z in memory and thus avoid having to recalculate results for frozen nodes. Put differently, after a fully fluid cycle (e.g., at time t+N+4), NN 100 can determine which nodes 101 in the next cycle will be frozen 101z, and preserve results, $R_{t+N+4}$, in memory. NN 100 can subsequently access the last fluid results, $R_{t+N+4}$ for the frozen nodes 101z during cycle t+N+5, t+N+6, t+N+7, etc. (until nodes 101 are liquefied). NN 100 can discard (e.g., clear from all memory) last fluid results, $R_{t+N+4}$, for irrelevant frozen nodes 101z. An irrelevant frozen node 101z can be a non-exit-frozen-node 101z that is not directly or indirectly linked (via an exclusively downstream pathway) to a downstream fluid node 101x. If such node is indirectly linked to a downstream fluid node 101x, then the node can still be irrelevant if every indirect pathway to the downstream fluid node 101x runs through a downstream frozen node 101z. Referring to FIG. 3E, at least frozen nodes 111f, 121f, 131c, 141f can be irrelevant frozen nodes. Node 141e, for example, is not irrelevant since node 141e, although frozen, contributes to $R_{t+N+5,\ 151d}$.

NN 100 can discard the results of each fluid ROI after a predetermined event, as illustrated with node 141a. Let node 141a be fluid in cycles t+N+4, t+N+5, and t+N+6. NN 100 can have discarded (e.g., deleted from all memory such that no electronic copy remains) $R_{t+N+4,\ 141a}$ before beginning to process t+N+5, before generating $R_{t+N+5}$, 141a, immediately after generating $R_{t+N+5,\ 141a}$, immediately after generating outcome 30 of t+N+5, before beginning cycle t+N+6, and/or immediately after generating before generating $R_{t+N+6,\ 141a}$. NN 100 can have discarded $R_{t+N+4,\ 141a}$ at least by the time any of the above discussed occurs. NN 100 can be configured to preserve the last fluid result of subsequently frozen nodes at least until the frozen nodes are liquefied.

NN 100 can further conserve resources by preserving, in memory, sums of weighted results, R, for fluid nodes 101x directly connected to frozen nodes. In FIG. 3E, the result of node 131b at time t+N+5 can rely on (e.g., be a function of) a sum of the weighted result of frozen node 121d, the weighted result of frozen node 121e, and the weighted result of fluid node 121a (this can occur in the case where the weight matrix, W, is applied as an inner product, •, to the intake matrix, IM, such that if W=[$W_1$, $W_2$, $W_3$] and IM=[$R_1$, $R_2$, $R_3$], then W·M=$W_1$+$W_2$ $R_2$+$W_3$ $R_3$. In this case, NN 100 can prestore: $(R_{t+n+4,\ 121d})(W_{131b,\ 121d})$+ $(R_{t+n+4,\ 121e})(W_{131b,\ 121e})$.

To save time, NN 100 can reference a prestored map (e.g., a lookup table) showing how freezing of any given input node 111 or group thereof propagates to downstream stream nodes. For example, the prestored map could provide: if entry nodes 111b-f are frozen, then nodes 121c-f, 131c, 141e-f, and 151e are also frozen.

Alternatively, or in addition, NN 100 can determine which nodes should be frozen in the next cycle in parallel with the current cycle. For example, NN 100 can access metadata 20 of cycle t+N+5 when beginning cycle t+N+4. As NN 100 works through each layer, NN 100 can determine how the entry nodes 111 to be frozen in cycle t+N+5 will propagate downstream.

Figure 4:
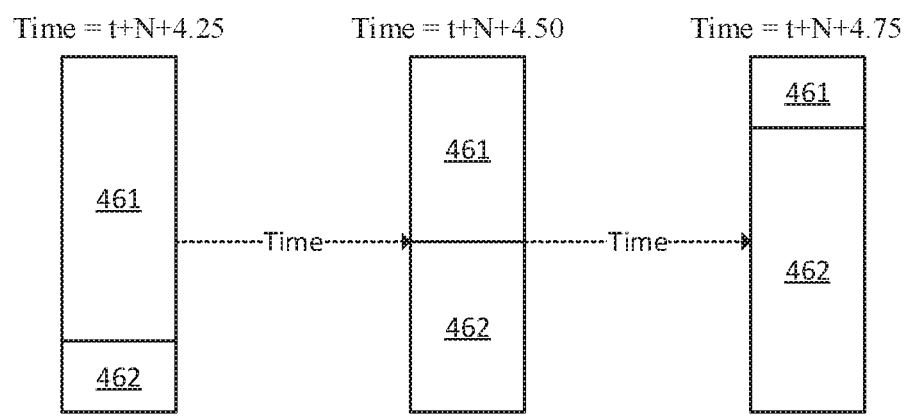
FIG. 4 shows the neural network performing frozen node propagation for an upcoming cycle in parallel with processing an entry.

In FIG. 4, box 461 represents layers remaining to process in cycle t+N+4. Box 462 represents (a) layers already processed in cycle t+N+4 and (b) freezing propagation through NN 100 during cycle t+N+5. Referring to FIG. 4, NN 100 has 75/100 layers remaining at time t+N+4.25 (e.g., NN 100 has processed every node 101 in the first 25 layers), 50/100 layers remaining at time t+N+4.50, and 25/100 layers remaining at time t+N+4.75.

NN 100 has mapped the propagation of frozen nodes in parallel with processing the layers. As a result, NN has mapped propagation through the first 25 layers at time t+N+4.25, the first 50 layers at t+N+4.50, and through the first 75 layers at time t+N+4.75. NN 100 can end freezing propagation upon reaching a layer with no frozen nodes in the upcoming cycle. NN 100 can perform freezing propagation for the upcoming cycle using the methods discussed with reference to FIGS. 3A-FIG. 3F.

FIG. 5 shows a first image 500a (e.g., an entry 10). FIGS. 6A and 6B show the first image 500a, a second image 500b, a third image 500c, and a fourth image 500d, which can respectively represent consecutive frames of a video (i.e., fourth image 500d can follow third image 500c, which can follow second image 500b, which can follow first image 500a). Images 500a-d depict a dog 501, the moon 502, grass 503, and night sky 504. NN 100 can consecutively act on images 500a-d. For each run (i.e., cycle) of NN 100, an input node 111 can output the color value of one image pixel. Entry nodes 111 can therefore be spatially arranged to 1:1 map with each image pixel.

Each image 500a-d is paired with an entry layer cycle 110a-d. For each cycle, white portions of entry layer 110 are fluid. Hatched portions of entry layer 110 are frozen. Three image pixels 511 and three mapping nodes 101 are shown schematically.

If images 500a-500d are in color (e.g., RGB space), then entry layer 110 can include three two-dimensional levels arranged in a stack. One level can map to the red color value of each image pixel, one level can map to the green color value of each image pixel, and one level can map to the blue color value of each image pixel. In this embodiment, the total number of input nodes can equal three times the total number of image pixels. For convenience, images 500a-d are assumed to be in gray-scale such that only one two-dimensional level in entry layer 110 is needed. The concepts discussed below can be applied to color images.

Images 500a-500d are each encoded with metadata 20 listing coordinates of a region-of-interest ("ROI") 600a-d. The ROIs 600a-d can determine the portions of the images 500a that link to fluid 101x entry nodes 111. Put differently, entry nodes 111 mapping to image pixels within ROIs 600a-d can be fluid while entry nodes 111 mapping to image pixels external to ROIs 600a-d can be frozen. A camera-equipped mobile device (i.e., an imaging device) encoded ROIs 600a-d when capturing the images. ROIs 600a-d were sized to enclose dog 501, which, for example, the mobile device had identified as an object of interest.

The entirety of image 500a is within ROI 600a. Therefore, every node 101 in NN 100 can be fluid. ROI 600b is centered about dog 501 in this example. Moon 502 moved between image 500a and 500b. But input nodes 101 mapping to moon 502 are frozen. As a result, NN 100 does not spend resources updating nodes 101 that would only produce results based on a new position of moon 502.

ROI 600c is in the same position as ROI 600b, although dog 501 has moved. According to some embodiments, encoded minor ROIs 600 (e.g., ROI 600b) cannot change without an intervening fluid reset ROI 600 (e.g., ROI 600a). Put differently, if dog 501 moved outside ROI 600b after second image 500b, the next frame would require a new fluid reset ROI 600a.

By fourth image 500d, dog 501 has moved outside ROI 600c. Therefore, according to some embodiments, the mobile device applied a fluid reset ROI 600d. The result of fluid reset ROI 600d is shown in input layer cycle 110a, but not input layer cycle 110d. According to some embodiments, when an object of interest (e.g., dog 501) exits a minor ROI 600 (e.g., ROIs 600b,c), the mobile device expands the ROI such that the expanded ROI (a) fully intersects the previous ROI and (b) encloses the object of interest.

Therefore, image 500d can include an expanded ROI 600dd. Expanded ROI 600dd includes previous/third ROI 600c and supplemental ROI region 600da. Input layer cycle 110d tracks expanded ROI 600dd. Broken line 110dd reflects the difference in area between previous ROI 600c and expanded ROI 600dd. The mobile device can automatically apply an expanded ROI 600dd and/or fluid reset 600a ROI based on detecting motion of the mobile device (e.g., panning and/or zooming).

According to some embodiments, each image includes a minor ROI enclosing a region of interest. NN 100 can compare each new minor ROI to the last minor ROI. If the ROIs are the same (e.g., new ROI 600c is the same as previous ROI 600b), then NN 100 can apply and/or reapply frozen and fluid nodes. If the ROIs are not the same, then NN 100 can automatically apply a fluid reset ROI to the new image. NN 100 can automatically apply a fluid reset ROI after a predetermined number of consecutive cycles with at least one fluid node. NN 100 can liquefy any node after a predetermined number of consecutive cycles where the node is frozen.

Alternatively, or in addition, NN 100 can determine whether the minor ROI can be supplemented (e.g., is suitable to be supplemented) into an expanded minor ROI (e.g., expanded minor ROI 600*dd*) or whether a fluid reset ROI (i.e., a fully expanded ROI) is necessary. NN 100 can default to expanding the previous ROI into a minor expanded ROI, which encompasses both the previous ROI and the new ROI if image metadata 20 does not indicate panning and/or zooming. NN 100 can default to applying a fluid reset ROI if image metadata 20 indicates a predetermined magnitude of camera panning and/or zooming (i.e., based on detecting a pan in the image metadata 20). A camera can encode panning metadata 20 based on acceleration detected by one or more accelerometers (i.e., gyroscopic sensors). A camera can encode zooming metadata 20 based on a known position of one or more camera lenses.

FIG. 7 shows an example outcome 30 of NN 100 after the cycle with entry layer 110*a* of FIG. 6A. The outcome 30 can be a map 700 (e.g., an image) with the same resolution as entry 10 (e.g., image 501). In FIG. 7, resolution units (e.g., image pixels) of map 700 external to dog 501 (i.e., the object of interest) were all assigned the same black color value. Resolution units mapping to dog 501 were all assigned the same white color value. As such, map 700 presents a two-dimensional profile of dog 501 (i.e., exhibits a profile feature extraction).

NN 100 can be a hardware neural network (e.g., a discrete processor can be devoted to computations for each node 101 and/or layer). NN 100 can be a software neural network (e.g., each node 101 can represent a software object). Not every layer of NN 100 must simultaneously exist. For example, NN 100 can include a plurality of different layers even if each layer exists at a different point in time.

The above-discussed mobile device and NN 100 can run (i.e., execute, process, etc.) on the same or different hardware. The mobile device can be a smartphone, a tablet, a dedicated camera assembly, or a laptop. The mobile device can be mounted to a larger structure (e.g., a vehicle or a house). The mobile device (or any other device, such as a vehicle or desktop computer) can include processing system 800. Processing system 800 can be distributed across a network (e.g., the Internet). The mobile device can include a first processing system. NN 100 can run on the first processing system (e.g., within the mobile device) or on a second processing system remote from the mobile device.

Referring to FIG. 8, a processing system 800 can include one or more processors 801, memory 802, one or more input/output devices 803, one or more sensors 804, one or more user interfaces 805, and one or more actuators 806. Processing system 800 can be configured to execute NN 100.

Processors 801 can include one or more distinct processors, each having one or more cores. Each of the distinct processors can have the same or different structure. Processors 801 can include one or more central processing units (CPUs), one or more graphics processing units (GPUs), circuitry (e.g., application specific integrated circuits (ASICs)), digital signal processors (DSPs), image signal processors (ISPs) and the like. Processors 801 can be mounted on a common substrate or to different substrates. Processors 801 can be configured to execute NN 100 by, for example, executing software configured to virtually create NN 100.

Processors 801 are configured to perform a certain function, method, or operation at least when one of the one or more of the distinct processors is capable of executing code, stored on memory 802 embodying the function, method, or operation. Processors 801 can be configured to perform any and all functions, methods, and operations disclosed herein.

For example, when the present disclosure states that processing system 800 performs/can perform task "X" (or task "X" is performed), such a statement should be understood to disclose that processors 801 can be configured to perform task "X". Mobile device 100 and processing system 800 are configured to perform a function, method, or operation at least when processors 801 are configured to do the same.

Memory 802 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 802 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 802.

Input-output devices 803 can include any component for trafficking data such as ports, antennas (i.e., transceivers configured to wirelessly send and/or receive data) 803*a*, printed conductive paths 803*b*, and the like. Input-output devices 803 can enable wired communication via USB®, DisplayPort®, HDMI®, Ethernet, and the like. Input-output devices 803 can enable electronic, optical, magnetic, and holographic, communication with suitable memory 802. Input-output devices 803 can enable wireless communication via WiFi®, Bluetooth®, cellular (e.g., LTE®, CDMA®, GSM®, WiMax®, NFC®), GPS, and the like. Input-output devices 803 can include wired and/or wireless communication pathways. As discussed above, processing system 800 can distributed. Input-output devices 803 can enable wireless communication between distributed processors 801 and/or memory 802.

Sensors 804 can capture physical measurements of environment and report the same to processors 801. Examples of sensors 804 include photodiodes and thermocouples. User interface 805 can include a display (e.g., LED touchscreens (e.g., OLED touchscreens), physical buttons, speakers, microphones, keyboards, and the like. Actuators 806 can enable processors 801 to control mechanical forces.

Processing system 800 can be distributed (e.g., primary non-volatile memory 423 can be disposed in a remote server and the other modules can be disposed in mobile device 100). Processing system 800 can have a modular design where certain modules have a plurality of the aspects shown in FIG. 8.

FIG. 9 shows an example method of processing data (e.g., image data, audio data, etc.) with a NN 100. At block 902, processing system 800 (via memory 802) can receive a first image including a first ROI. The ROI can be appended as image metadata. At block 904, processing system 800 can process the first image with a NN 100.

NN 100 can include an entry layer having fluid entry nodes, a first hidden layer having fluid first hidden nodes, a second hidden layer having fluid second hidden nodes, and an exit layer including fluid exit nodes. The processing of the first image can cause each node to assume a first state. NN 100 can exist as dedicated hardware (e.g., one or more the processors and memory can be exclusively devoted to executing NN 100). NN 100 can exist virtually, where a general purpose processor simulates the nodes and connections therebetween based on software. As discussed above, not every layer of NN 100 must simultaneously exist. For example, the one or more processors can sequentially simulate the layers such that no two layers simultaneously exist.

At block 906, processing system 800 can produce a first outcome (i.e., result) from (e.g., based on) the processing of the first image through NN 100. The first outcome can be based on the first states of the exit nodes. The outcome can be, for example, a map 700 identifying which image pixels in the first image correspond to a predetermined feature (e.g., an animal, a human). At block 908, processing system 800 can use the first outcome when executing a downstream program (e.g., an image editing program configured to apply a depth-of-field effect to the first image based on map 700; a feature recognition program configured to identify an object in the first image based on map 700).

At block 910, processing system 800 can receive a second image. The second image can include a second ROI. The second ROI can be smaller than the first ROI. At block 912, processing system 800 can freeze at least some of the hidden nodes based on the second ROI. For example, processing system 800 can freeze all hidden nodes that do not receive data (e.g., indirectly through upstream nodes) from the region of the second image falling within the second ROI. Processing system 800 can keep at least some of the hidden nodes fluid. More specifically, processing system 800 can keep fluid each hidden that will receive data (e.g., indirectly through upstream nodes) from within ROI.

At block 914, processing system 800 can process the second image through NN 100. The processing can cause fluid nodes to assume a second state based on data within the second ROI. During the processing, frozen nodes can remain in their first states. At block 916, processing system 800 can produce a second outcome (i.e., result) from (e.g., based on) the processing of the second image through the neural network. The second outcome can be based on the second states of the exit nodes, which can be based on first states of frozen hidden nodes and second states of fluid hidden nodes. The outcome can be, for example, a map 700 identifying which image pixels in the second image correspond to a predetermined feature (e.g., an animal, a human). At block 918, processing system 800 can use the second outcome when executing a downstream program (e.g., an image editing program configured to apply a depth-of-field effect to the second image based on map 700; a feature recognition program configured to identify an object in the second image based on map 700).

At block 920, processing system 800 can receive a third image. The third image can include a fluid reset ROI. At block 922, processing system 800 can liquefy all frozen nodes in response to the fluid reset ROI. At block 924, processing system 800 can process the third image through NN 100. Due to the fluid reset, each node can be fluid during the third image processing. At block 926, processing system 800 can produce a third outcome from (e.g., based on) the processing of the third image through the neural network. The third outcome can be based on third states of the hidden nodes. At block 928, processing system 800 can use the third outcome when executing a downstream program (e.g., an image editing program configured to apply a depth-of-field effect to the third image based on map 700; a feature recognition program configured to identify an object in the third image based on map 700).

As used herein, the phrase "based on" can mean "based only on" and/or "based at least on." The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The methods disclosed herein comprise one or more steps or actions for achieving the described method. The method blocks may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the configurations and components discussed above. Various modifications, changes, and variations may be made in the arrangement, operation, and details of the features described herein without departing from the scope of the claims.

What is claimed is:

1. A system for processing image data with a neural network, the system comprising:
   memory configured to store image data, including a first image and a second image;
   one or more processors configured to process images through the neural network,
   the neural network comprising:
      an entry layer comprising fluid entry nodes;
      a first hidden layer comprising fluid first hidden nodes;
      a second hidden layer comprising fluid second hidden nodes; and
      an exit layer comprising fluid exit nodes;
   the one or more processors being configured to:
      process the first image through the neural network, the first image causing each of the fluid first hidden nodes, the fluid second hidden nodes, and the fluid exit nodes to assume a first state;
      access the second image and a region-of-interest (ROI) mapping to the second image;
      freeze at least some of the fluid first hidden nodes that link to the ROI while keeping at least some of the first hidden nodes that do not link to the ROI fluid; and
      process the second image through the neural network to cause each of the fluid first hidden nodes to assume a second state while at least some of the frozen first hidden nodes remain in the first state.

2. The system of claim 1, wherein the first state of each node is an output of the node generated during the processing of the first image through the neural network and the second state of each fluid node is an output of the fluid node during the processing of the second image through the neural network.

3. The system of claim 2, wherein the one or more processors are configured to, when processing the second image through the neural network, cause at least one of the frozen first hidden nodes to send a nonzero value to at least one of the second hidden nodes.

4. The system of claim 1, wherein the one or more processors are configured to:
   preserve a first state of a frozen first hidden node in memory;

recall the first state of the frozen first hidden node from memory when processing the second image through the neural network.

5. The system of claim 4, wherein the one or more processors are configured to:
discard a first state of a first hidden node that is fluid during the processing of the second image before discarding a first state of a first hidden node that is frozen during the processing of the second image.

6. The system of claim 5, wherein the one or more processors are configured to:
discard the first state of the first hidden node that is fluid during the processing of the second image at least two cycles before discarding the first state of the first hidden node that is frozen during the processing of the second image.

7. The system of claim 6, wherein the one or more processors are configured to liquefy each frozen node based on detecting a pan in the image metadata.

8. The system of claim 7, wherein the one or more processors are configured to liquefy a frozen node based on determining that a predetermined number of consecutive cycles have occurred where the node was frozen.

9. The system of claim 1, wherein the one or more processors are configured to freeze each first hidden node with a receptive field consisting of entry nodes outside the ROI.

10. The system of claim 1, wherein the one or more processors are configured to keep, as liquid, each first hidden node with a receptive field comprising an entry node within the ROI.

11. The system of claim 1, wherein the one or more processors are configured to:
generate a first outcome by processing the first image through the neural network;
generate a second outcome by processing the second image through the neural network;
edit the first image based on the first outcome and edit the second image based on the second outcome.

12. The system of claim 1, wherein the one or more processors are configured to:
generate a first outcome by processing the first image through the neural network;
generate a second outcome by processing the second image through the neural network;
perform feature recognition on the first image based on the first outcome and perform feature recognition on the second image based on the second outcome.

13. A method of processing image data with a neural network, the neural network comprising: (a) an entry layer comprising fluid entry nodes, (b) a first hidden layer comprising fluid first hidden nodes, (c) a second hidden layer comprising fluid second hidden nodes, and (d) an exit layer comprising fluid exit nodes;
the method comprising, via a processing system comprising one or more processors and memory configured to store image data, including a first image and a second image:
processing the first image through the neural network, the first image causing each of the fluid first hidden nodes, the fluid second hidden nodes, and the fluid exit nodes to assume a first state;
accessing the second image and a region-of-interest (ROI) mapping to the second image;
freezing at least some of the fluid first hidden nodes that link to the ROI while keeping at least some of the first hidden nodes that do not link to the ROI fluid; and
processing the second image through the neural network to cause each of the fluid first hidden nodes to assume a second state while at least some of the frozen first hidden nodes remain in the first state.

14. The method of claim 13, wherein the first state of each node is an output of the node generated during the processing of the first image through the neural network and the second state of each fluid node is an output of the fluid node during the processing of the second image through the neural network.

15. The method of claim 14 comprising: causing at least one of the frozen first hidden nodes to send a nonzero value to at least one of the second hidden nodes when processing the second image through the neural network.

16. The method of claim 13 comprising: liquefying each frozen node based on detecting a pan in the image metadata.

17. The method of claim 13 comprising: freezing each first hidden node with a receptive field consisting of entry nodes outside the ROI.

18. The method of claim 13 comprising:
generating a first outcome by processing the first image through the neural network;
generating a second outcome by processing the second image through the neural network;
editing the first image based on the first outcome and editing the second image based on the second outcome.

19. The method of claim 13 comprising:
generating a first outcome by processing the first image through the neural network;
generating a second outcome by processing the second image through the neural network;
performing feature recognition on the first image based on the first outcome and performing feature recognition on the second image based on the second outcome.

20. A non-transitory computer-readable storage medium comprising instructions, the instructions comprising:
code for executing a neural network comprising: (a) an entry layer comprising fluid entry nodes, (b) a first hidden layer comprising fluid first hidden nodes, (c) a second hidden layer comprising fluid second hidden nodes, and (d) an exit layer comprising fluid exit nodes;
code for processing a first image through the neural network, the first image causing each of the fluid first hidden nodes, the fluid second hidden nodes, and the fluid exit nodes to assume a first state;
code for accessing a second image and a region-of-interest (ROI) mapping to the second image;
code for freezing at least some of the fluid first hidden nodes that link to the ROI while keeping at least some of the first hidden nodes that do not link to the ROI fluid; and
code for processing the second image through the neural network to cause each of the fluid first hidden nodes to assume a second state while at least some of the frozen first hidden nodes remain in the first state.

* * * * *